United States Patent [19]

Borschert et al.

[11] Patent Number: 5,678,673

[45] Date of Patent: Oct. 21, 1997

[54] MOTOR VEHICLE CLUTCH ASSEMBLY HAVING A HYDRAULIC ACTUATOR, WHICH HYDRAULIC ACTUATOR HAS A CLUTCH POSITION REGULATING SYSTEM

[75] Inventors: Udo Borschert, Sennfeld; Lutz Leimbach, Oberwerrn; Manfred Waning, Wonfurt; Michael Zottmann, Dittelbrunn, all of Germany

[73] Assignee: Fichtel & Sachs AG, Schweinfurt, Germany

[21] Appl. No.: 531,452

[22] Filed: Sep. 21, 1995

[30] Foreign Application Priority Data

Sep. 22, 1994 [GB] United Kingdom ............ 44 33 825.2

[51] Int. Cl.$^6$ ............... B60K 23/02; H02K 7/116; F16D 29/00
[52] U.S. Cl. .............. 192/84.6; 192/90; 192/91 A; 192/109 R; 192/142 R
[58] Field of Search ............... 192/84 R, 30 W, 192/85 C, 90, 91 R, 91 A, 84.6, 142 R, 109 R; 477/16, 20; 318/476, 477, 469

[56] References Cited

U.S. PATENT DOCUMENTS

| | | | |
|---|---|---|---|
| 4,440,279 | 4/1984 | Schreiner | 192/30 W |
| 4,557,355 | 12/1985 | Wilke et al. | 192/90 X |
| 4,591,034 | 5/1986 | Tellert et al. | 192/84 R X |
| 4,601,374 | 7/1986 | Ladin | 192/91 A X |
| 4,651,855 | 3/1987 | Grunberg | 192/90 X |
| 4,829,221 | 5/1989 | Grunberg et al. | 192/90 X |
| 4,852,419 | 8/1989 | Kittel et al. | 192/84 R X |
| 4,865,173 | 9/1989 | Leigh-Monstevens et al. | 192/90 X |
| 4,890,711 | 1/1990 | Carmillet et al. | 192/90 X |
| 4,911,278 | 3/1990 | Leigh-Monstevens et al. | 192/91 R X |
| 4,934,501 | 6/1990 | Gay et al. | 192/30 W X |
| 5,058,718 | 10/1991 | Tojima et al. | 192/30 W |
| 5,127,281 | 7/1992 | Yanawgisawa | 192/91 A X |
| 5,267,635 | 12/1993 | Peterson et al. | |
| 5,421,440 | 6/1995 | Kumagai | 192/90 |

FOREIGN PATENT DOCUMENTS

| | | |
|---|---|---|
| 0359853 | 3/1990 | European Pat. Off. . |
| 3706849 | 9/1988 | Germany . |
| 2204657 | 11/1988 | United Kingdom . |

*Primary Examiner*—Rodney H. Bonck
*Attorney, Agent, or Firm*—Nils H. Ljungman and Associates

[57] ABSTRACT

An actuator for a motor vehicle friction clutch comprises a drive system, a transmission which converts its motion into an essentially translational motion of an output element, whereby the travel of the transmission can be limited by at least one stop, and a clutch position regulating system. The clutch position regulating system is provided with a monitoring device, by means of which the drive can be monitored to detect the energy feed and direction of operation, and an incremental position sensor can be monitored to detect changes in position corresponding to transmission movements in which, when an energy feed to the drive is converted into a corresponding change in position on the incremental position sensor, the new position of the transmission can be determined in relation to the old position, while when the incremental position sensor comes to a stop when there is a continued supply of energy to the drive, by means of the direction of operation of the drive, that is interpreted as an indication that the defined reference position of the transmission corresponding to this direction of operation has been reached, whereby the reference position is assumed when the transmission comes into contact with the stop which corresponds to the direction of operation of the drive.

19 Claims, 5 Drawing Sheets

II-II

III-III

MOTOR VEHICLE CLUTCH ASSEMBLY HAVING A HYDRAULIC ACTUATOR, WHICH HYDRAULIC ACTUATOR HAS A CLUTCH POSITION REGULATING SYSTEM

BACKGROUND OF THE INVENTION

1. Field of the Invention

The present invention generally relates to an actuator, in particular, for a motor vehicle friction clutch with a drive system. The actuator includes a transmission, which transmission converts the motion of the drive system into an essentially translational motion of an output element, whereby the travel of the transmission can be limited by at least one stop. The actuator also has a clutch position regulating system.

2. Background Information

German Patent No. 37 06 849 A1 discloses an actuator which has a drive system, the motion of which drive system is converted into an essentially translational motion of an output element, in the form of a hydraulic master cylinder, by a transmission. The travel of the transmission is limited by stops. The actuator also has a clutch position regulating system. The clutch position regulating system includes a potentiometer which emits electrical output signals, which output signals are a function of the respective position of the transmission. It thereby becomes possible to indicate the current position of the piston of the master cylinder and, thus, the travel of the application spring of a clutch which can be displaced by a slave cylinder, which slave cylinder is connected hydraulically to the master cylinder. But with potentiometers, the frictional engagement with an electrically conductive surface which is required to obtain the above-mentioned electrical output signals has been found to be disadvantageous, since over long periods of operation, the effects of wear become apparent. As a result of such wear, the reliability of the potentiometer cannot be absolutely guaranteed.

OBJECT OF THE INVENTION

The object of the present invention is to improve an actuator with a clutch position regulating system so that the clutch position regulating system can detect, without wear, the current position of a transmission corresponding to a drive system, and thus actuate an output element.

SUMMARY OF THE INVENTION

The present invention teaches that this object can be accomplished by a clutch position regulating system. It is thereby essential that the monitoring device, with which the clutch position regulating system is provided, has an incremental position sensor. The signals supplied by this incremental position sensor can be compared to additional signals from the monitoring device, which monitoring device, the present invention teaches, can measure the energy fed to the drive, and the direction of the motion resulting from the feed of this energy to the drive. This information can be obtained, on a drive system designed as an electric motor, for example, by measuring the current fed to the motor. The direction of rotation of the rotor can also be determined by the sequence in which electromagnets of the electric motor are essentially actuated to drive the rotor. The result achieved is described below:

When energy is fed to the drive system, the drive system can impart a motion to the transmission, as long as the resistance offered to the drive system by the transmission or the output element does not exceed the power of the drive system. This motion can be detected by the incremental position sensor, which incremental position sensor can then inform the monitoring device of a change in position of the transmission. While the incremental position sensor accordingly can indicate the distance between the new position and the previous position of the transmission, it is unable to determine the absolute position of the transmission.

If the drive continues to be supplied with energy, and if the transmission has already reached the stop which corresponds to the previous direction of motion, and has therefore come to a standstill, the drive system can also come to a stop, although energy can continue to be supplied. The result is a situation in which the monitoring device, on one hand, can determine that energy is being supplied to the drive system, but, on the other hand, the monitoring device does not receive any of the signals which indicate motion from the incremental position sensor, because the transmission has come to a standstill. From this combination of information, the monitoring device can conclude that the transmission has reached a defined limit position, namely the stop which corresponds to the previous direction of motion. Thus, the absolute position of the transmission can be known. Thereby the absolute position can be used as a reference position for the additional movement which can be imparted to the transmission by the drive. From that point on, for additional movements of the transmission, the signals from the incremental position sensor are sufficient, since each change in position of the transmission can essentially always be tracked by the monitoring device, in terms of the reference position determined at the stop.

If, due to a disruption or malfunction in the monitoring device, the information regarding the reference position should ever be lost, the loss of the information does not represent a problem, since in the worst case, when a movement is imparted by the drive, the transmission will essentially run up against the corresponding stop. As soon as the monitoring device can detect this condition, a new reference position can be defined on account of the failure to convert the energy feed into a corresponding motion. This new reference position need not necessarily correspond to the position which the transmission can assume when the transmission reaches the above-mentioned stop, but it can also be defined as the second limit position of the transmission, in which second limit position, the transmission can be in contact with a stop at the other end of its travel. It is only essential that there be a reference position, from which reference position, changes in position can be determined by the incremental position sensor.

Consequently, by recording the information from the incremental position sensor and the drive, it can be possible for the monitoring device to make a contactless determination of the current absolute position of the transmission and the relative change in its position. Since, because there is essentially no contact, the effect of wear can be practically completely eliminated, the clutch position regulating system can remain fully functional even after very long periods of operation. Moreover, the incremental position sensor can be located at various positions of the transmission, namely anywhere movement can occur. The incremental position sensor can therefore be installed so that it can occupy a minimum amount of space in the housing of the actuator. A device for the determination of an energy feed to the drive system and of the direction of operation of the drive system can be installed in the housing of the actuator, and possibly even outside the housing, so that no special space needs to be reserved for the monitoring device in the housing.

In accordance with an embodiment of the invention, there can also be a measurement device which makes it possible to transmit the signals relating to the drive system to the monitoring device.

As indicated above, there may be a disruption or malfunction in the monitoring device if, during the operation of the actuator device, the transmission encounters a stop corresponding to its previous direction of motion, in which case a new determination of the reference position can preferably be performed. Normally, however, such a determination process for the reference position can essentially only be performed during the startup of the monitoring device, e.g. when the engine of the motor vehicle is started up, or during the initial clutch engagement or disengagement operation. As long as this initial determination of the reference position has not yet taken place, the determination of the instantaneous absolute position of the transmission can start from a default or backup position. The default or backup position can be obtained, for example, by reusing the reference position which was determined on the occasion of the most recent previous operation of the actuator, until a new reference position can be determined. The default position could also be determined in another manner, if, for example, it can be possible to evaluate other information available to the monitoring device, namely, the input and output speed of the clutch, and a conclusion can thereby be reached regarding a defined position of the transmission.

In accordance with an embodiment of the present invention, there can be an advantageous site for the installation of the incremental position sensor, since the incremental position sensor can relatively easily be installed at the indicated point. In addition, by monitoring the output shaft of the drive, it can be possible to essentially easily detect movements of the drive.

In accordance with one advantageous embodiment of the drive, the drive can include an electric motor.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a hydraulically operated clutch assembly for a motor vehicle, the clutch assembly comprising: a flywheel having an axis of rotation and defining an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; means for hydraulically activating the clutch disc; the hydraulic activating means comprising: chamber means, the chamber means having a first end and a second end, at least a portion of the chamber means containing hydraulic fluid therein; means for being acted upon by the hydraulic fluid; the means for being acted upon by the hydraulic fluid being disposed in the chamber means; means for operatively connecting the pressure plate to the means for being acted upon by the hydraulic fluid; means for providing hydraulic fluid into and out of the chamber means to activate the pressure plate; means for actuating the hydraulic activating means; the actuating means comprising: a housing; a mechanical drive mechanism for converting a first geometric movement into a second geometric movement; the mechanical drive mechanism comprising means for driving at least one component of the mechanical drive mechanism; the driving means being connected in the mechanical drive mechanism to provide power to the mechanical drive mechanism, and thus to operate the hydraulic activating means; cylinder means for providing hydraulic fluid under pressure to the means for providing hydraulic fluid into and out of the chamber means; the mechanical drive mechanism being connected to the cylinder means to provide flow of hydraulic fluid into and out of the chamber means; means for sensing the position of the at least one component of the mechanical drive mechanism; the means for sensing the position of the at least one component of the mechanical drive mechanism comprising: means for providing a reference position relating to at least one component of the mechanical drive mechanism; means for providing differences in position of the at least one component of the mechanical drive mechanism; means for accepting signals indicating differences in position of the at least one component from the means for providing differences in position of the at least one component of the mechanical drive mechanism; the means for accepting signals indicating differences in position of the at least one component together with a signal relating to the reference position provided by the means for providing a reference position to thus provide a signal relating to a resultant position of the at least one component of the mechanical drive mechanism; and means for providing signals from the means for sensing the position of at least one component of the mechanical drive mechanism to the driving means to control movement of the driving means.

Another aspect of the present invention resides broadly in an actuator for a hydraulically operated clutch assembly, said actuator comprising: a housing; a mechanical drive mechanism for converting a first geometric movement into a second geometric movement; the mechanical drive mechanism comprising means for driving at least one component of the mechanical drive mechanism; the driving means being connected in the mechanical drive mechanism to provide power to the mechanical drive mechanism, and thus to operate the hydraulic activating means; cylinder means for providing hydraulic fluid under pressure to the means for providing hydraulic fluid into and out of the chamber means; the mechanical drive mechanism being connected to the cylinder means to provide flow of hydraulic fluid into and out of the chamber means; means for sensing the position of the at least one component of the mechanical drive mechanism; the means for sensing the position of the at least one component of the mechanical drive mechanism comprising: means for providing a reference position relating to at least one component of the mechanical drive mechanism; means for providing differences in position of the at least one component of the mechanical drive mechanism; means for accepting signals indicating differences in position of the at least one component from the means for providing differences in position of the at least one component of the mechanical drive mechanism; the means for accepting signals indicating differences in position of the at least one component together with a signal relating to the reference position provided by the means for providing a reference position to thus provide a signal relating to a resultant position of the at least one component of the mechanical drive mechanism; and means for providing signals from the means for sensing the position of at least one component of the mechanical drive mechanism to the driving means to control movement of the driving means.

BRIEF DESCRIPTION OF THE DRAWINGS

The present invention is explained below in greater detail with reference to the accompanying drawings, in which.

DESCRIPTION OF THE PREFERRED EMBODIMENT

Figure 1:
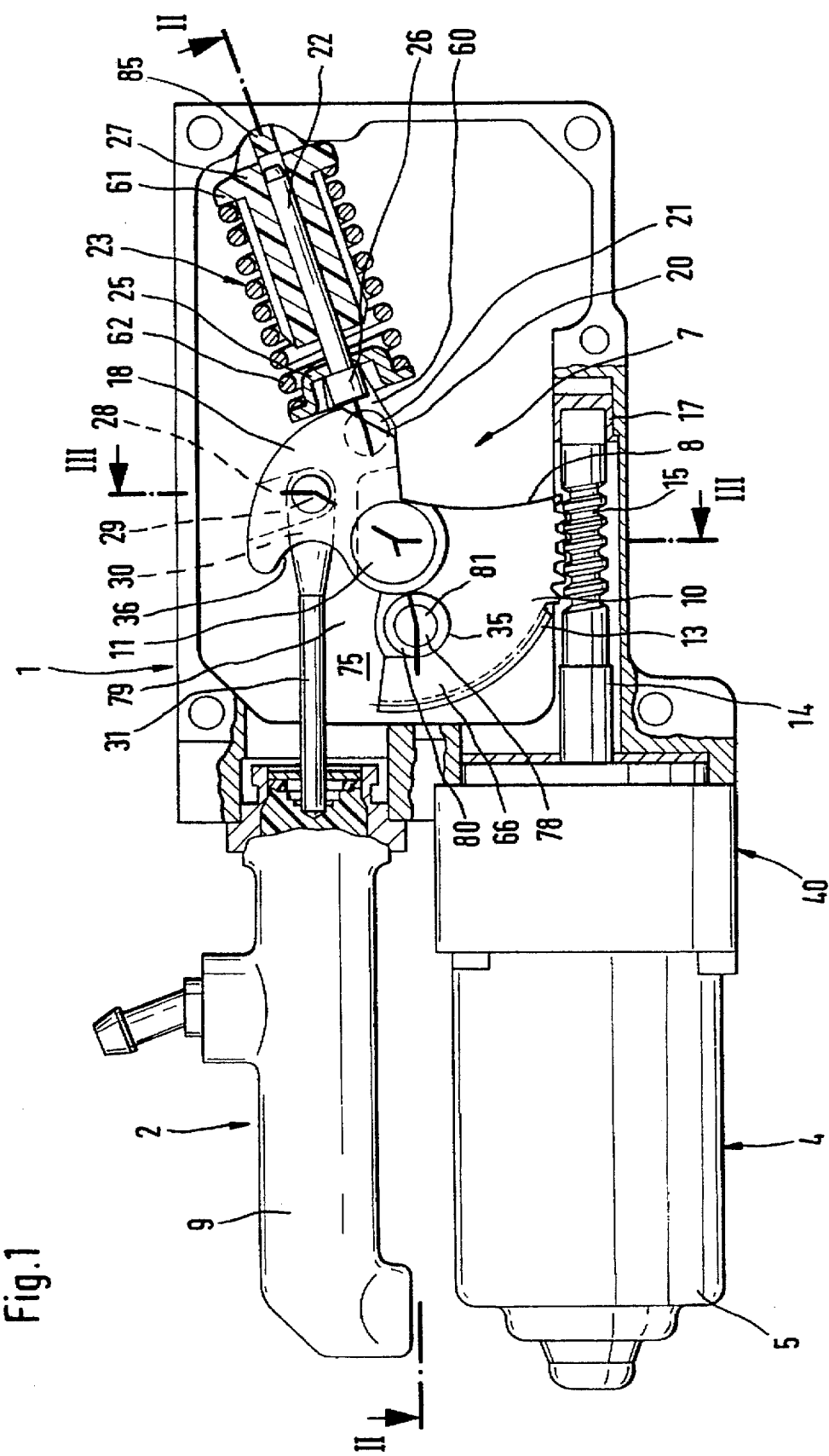
FIG. 1 shows an overhead view in partial cross section of an electric motor actuator for a motor vehicle friction clutch with a hydraulically actuated clutch disengagement system.
Figure 2:
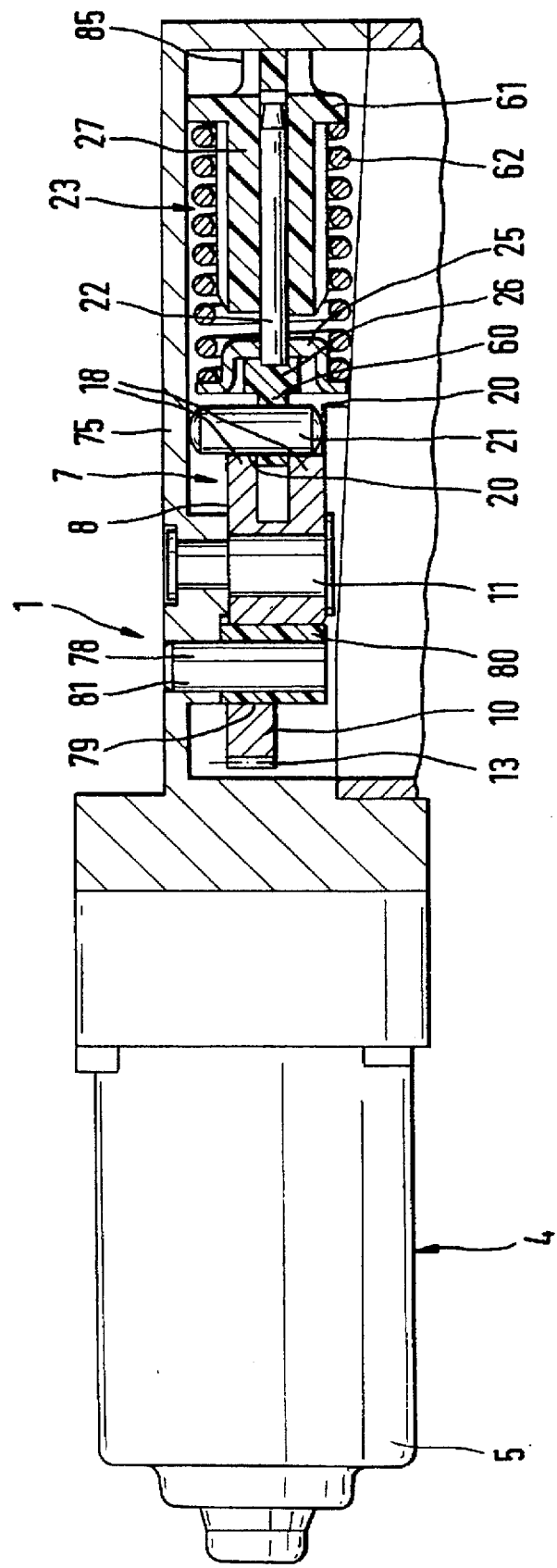
FIG. 2 shows a sectional view of the actuator, viewed along Line II—II in FIG. 1.
Figure 3:
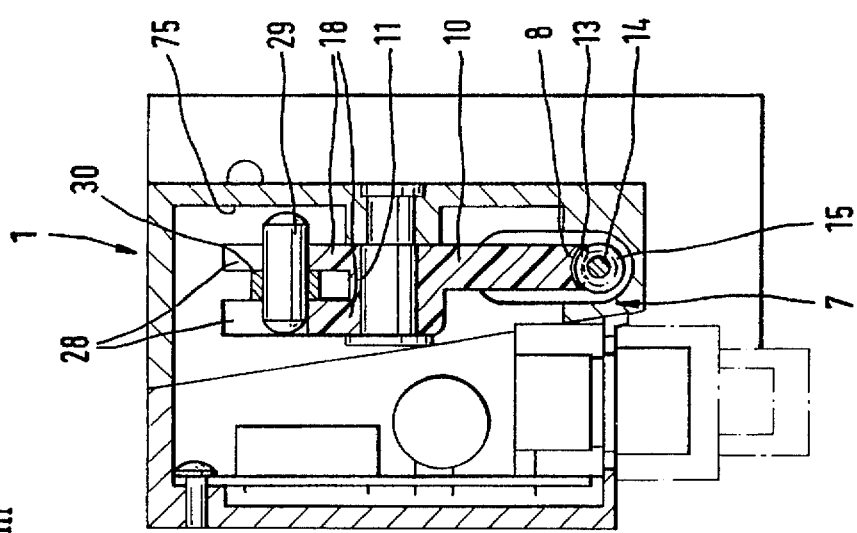
FIG. 3 shows a sectional view of the actuator, viewed along Line III—III in FIG. 1.

FIGS. 1 to 3 illustrate an actuator for a motor vehicle friction clutch, which friction clutch can have a hydraulic clutch disengagement system. The actuator can include a housing 1 with a drive 4. The drive 4 can be in the form of an electric motor 5. The drive 4 can actuate an output element 2 in the form of a hydraulic master cylinder 9 of the hydraulic clutch disengagement system by means of a transmission 7. The hydraulic master cylinder can preferably include a piston rod 31. The transmission 7 can be designed as a crank mechanism.

The transmission or crank mechanism 7 can act as a worm gear pair 8, which worm gear pair 8 can have a segment worm gear 10. The segment worm gear 10 can be rotationally mounted on a bearing neck 11, which bearing neck 11 can be fastened by its one end in the housing part 1. A worm gear 15 can sit directly on an output shaft 14 of the drive system 4, which worm gear 15 can be engaged with a worm gear thread 13 on the circumference of the segment worm gear 10. The drive shaft 14 can be mounted with its free end in the housing 1 by means of a sleeve 17. On the segment worm gear 10 there can be cheeks 18, which cheeks 18, viewed in the axial direction of the bearing neck 11, can be located at some distance from one another. In the cheeks 18, there can be first recesses 20, which first recesses 20 can preferably be aligned with one another. There can also be a bolt 21 in the cheeks 18, which bolt 21 can run parallel to the bearing neck 11. The bolt 21 can be inserted and fastened in an eye 60 of a tappet rod 22. The tappet rod 22 can be located so that it can be displaced in a plastic bushing 27.

The plastic bushing 27 can be mounted with its end farther from the bolt 21 so that the plastic bushing 27 can pivot in a bearing 85 in the housing 1. The plastic bushing 27 can have a seat 61 for a spring 62. The spring 62 can be supported with its end facing the segment worm gear 10 on a spring plate 25. The spring plate 25 can come into contact, with its side farther from the spring 62, with a radially expanded shoulder 26 of the tappet rod 22. An energy storing device 23 can be formed by the plastic bushing 27, together with the tappet rod 22 (surrounding the bolt 21), along with the spring 62, and the spring plate 25.

The bearing point 85 of the energy storing device 23 on the housing 1 can be located relative to the center axis of the bearing neck 11. Thereby, the energy storing device 23, in its limit position, as illustrated in FIG. 1, can assume a position slightly past top dead center opposite to the disengagement direction of rotation of the segment worm gear 10. Such a position past top dead center to stabilize the limit position is described in detail in German Patent No. 37 096 849 A1.

In summary, in accordance with an embodiment of the present invention, the housing 1 can have a sleeve 17, which sleeve 17 can preferably connect the free end of the drive shaft 14 with the housing 1. The segment worm gear 10 can include the cheeks 18, which cheeks 18 can be located an axial distance with respect to one another. In the cheeks 18, the first recesses 20 can preferably be aligned with one another to thereby essentially provide support for the bolt 21. The end of the tappet rod 22 can preferably include the eye 60, in which eye 60, the bolt 21 can preferably be fastened. Since the bolt 21 can essentially provide a connection between the segment worm gear 10 and the eye 60 of the tappet rod 22, the rotation of the segment worm gear 10 can thereby act on the energy storing device 23, which energy storing device 23 can preferably include the tappet rod 22. In addition, the plastic bushing 27 can surround the tappet rod 22 such that when the segment worm gear 10 rotates the tappet rod 22, the plastic bushing 27 can also move relative to the segment worm gear 10. The plastic bushing 27 can be designed such that the end of the plastic bushing 27, which end faces away from the bolt 21, can pivot in the bearing 85.

At an angular offset, with respect to the first recesses 20, to the center axis of the bearing neck 11, there can preferably be additional recesses 28 (as best shown in FIG. 3) in the cheeks 18 of the segment worm gear 10. The additional recesses 28 can preferably be aligned with one another, and can be provided to hold a bolt 29. The bolt 29 can be surrounded by an eye 30 of the piston rod 31 of the hydraulic master cylinder 9. The additional recesses 28 can preferably be oriented, or possibly angled, toward the energy storing device 23 such that the bolt 29, once the bolt 29 has been introduced from radially outside into the additional recesses 28, can be held by the action of the energy storing device 23 on the radially inner end of the additional recesses 28. The angle of rotation of the segment worm gear 10 can thereby be limited so that this advantageous action of the energy storing device 23 can be preserved under essentially all conditions.

The housing 1 can have a base 75, in which base 75, a pivot 78 can be fastened. The pivot 78 can be provided, at least in the longitudinal portion of a recess 79 in the segment worm gear 10, with an elastic jacket 80. This pivot 78 can act as a stop 81 for limits 35, 36 of the recess 79 lying in the circumferential direction.

The transmission can function as follows:

A motion imparted by the drive system 4 can cause a rotation of the output shaft 14, so that a worm gear 15 located on the drive shaft 14, and thus the segment worm gear 10 can be placed in rotational motion. As a function of the direction of the drive, the piston rod 31 of the hydraulic master cylinder 9 can be moved inward or outward. The energy storing device 23 thereby can act as follows:

In the limit position of the segment worm gear 10 corresponding to the engaged position of the clutch, as illustrated in FIG. 1, the spring 62 can be almost completely taut. If the drive system 4 propels the segment worm gear 10 in the clutch disengagement direction, i.e. counterclockwise, with respect to FIG. 1, the spring 62 can become relaxed after the spring 62 essentially passes through its top dead center position. The spring 62 can thus assist the drive 4. In this manner, the clutch can be disengaged quickly, even when the drive mechanism is comparatively weak. In the engagement direction, the drive system 4, the direction of rotation of which drive system 4 has been reversed, with respect to FIG. 1, can be assisted by the clutch application spring. Thus, in spite of the comparatively low drive power of the drive system 4, tension can once again be applied to the spring 62.

The stop 81 can be engaged in the recess 79, which recess 79, seen in the circumferential direction, can preferably be adapted to the size of the predetermined pivot angle of the segment worm gear 10. As a result, when the predetermined pivot angle is essentially exceeded, the segment worm gear 10 can essentially always be in contact with one of the limits 35, 36 on the edges of the recess 79 on the stop 81. The same can be true for a motion in the opposite direction.

In summary, in accordance with an embodiment of the present invention, the stop 81 can include the limit 35, which limit 35 can prevent the segment worm gear 10 from exceeding an angle of rotation in a clockwise direction, with respect to FIG. 1. Similarly, the stop 81 can include the limit 36, which limit 36 can prevent the segment worm gear 10 from exceeding an angle of rotation in a counterclockwise direction, with respect to FIG. 1.

Figure 4A:
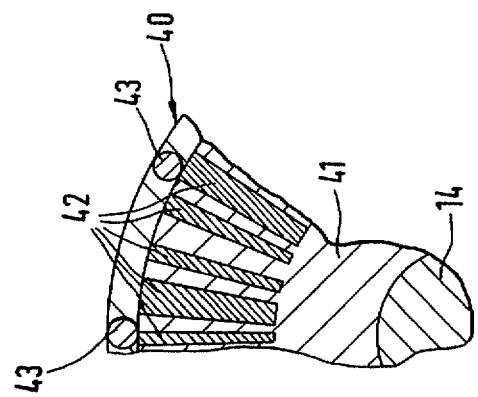
FIG. 4a shows another view of the incremental position sensor as shown in FIG. 4.
Figure 4:
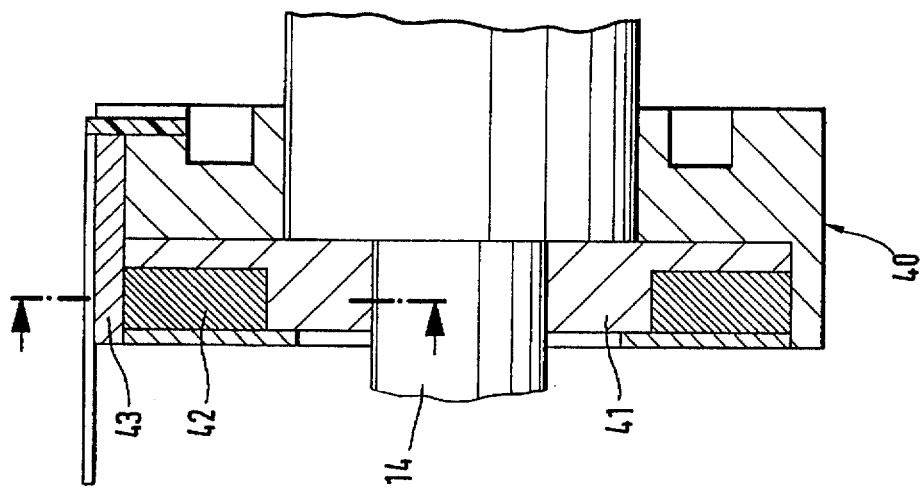
FIG. 4 shows a detail of an incremental position sensor on the actuator, in a sectional view.

Fastened to the drive 4, on the side of the drive 4 facing the transmission 7, an incremental position sensor 40 can be fastened. The incremental position sensor 40 can be designed as follows:

Fastened to the output shaft 14 of the drive 4 is a pulse ring 41 (as shown in FIGS. 4 and 4a). Over the circumference of the pulse ring 41, there can preferably be a number of magnetically alternating poles 42. These poles 42 can be scanned by sensors 43 in the form of Hall effect sensors, which can be located at some distance from one another, in the direction of rotation of the pulse ring 41. Thereby, when the pulse ring 41 essentially rotates with the output shaft 14, a periodic change can be introduced in the individual sensors on account of the alternating magnetic effect of the magnetic flux. This change can lead to a digital switchover of the sensors 43, and thus, to a corresponding change in the voltage at the signal outputs of the sensors 43. The sequence of signals emitted by the sensors 43 and triggered by the pulse ring 41 can be a function of the direction of rotation, so that the direction of rotation of the output shaft 14 can be determined on the basis of the respective sequence of signals.

In summary, in accordance with an embodiment of the present invention, the pulse ring 41 can preferably surround the output shaft 14. On the circumference of the pulse ring 41 there can be sensors 43, which sensors 43 can surround the magnetically alternating poles 42. The rotation of the output shaft 14 can cause a rotation of the pulse ring 41 whereby, depending upon the direction of rotation of the output shaft 14, the sensors 43 can emit a sequence of signals corresponding to the voltage of the sensors 43. As a result, the pulse ring 41 can determine the direction of rotation of the output shaft 14.

In accordance with an embodiment of the present invention, the incremental position sensor 40 can include Hall effect sensors whereby there is essentially no wear of the sensing components of the actuator. With known devices, on the other hand, a potentiometer is typically used to sense the position of the transmission. Due to the frictional engagement of the electrically conductive surfaces of the potentiometer, however, the potentiometer can become severely worn after a long period of use. As a result of such wear, the potentiometer becomes unreliable. It is therefore an advantageous feature of the present invention that the incremental position sensor 40 includes Hall effect sensors with magnetically alternating poles 42 and the pulse ring 41. Since the Hall effect sensors can sense the position of the transmission 7 by means of a magnetic flux, the surfaces of the Hall effect sensors need not be frictionally engaged with one another. Thus, it can thereby be possible to prevent any wear to the incremental position sensor 40, thus increasing the reliability of the incremental position sensor 40.

Figure 5:
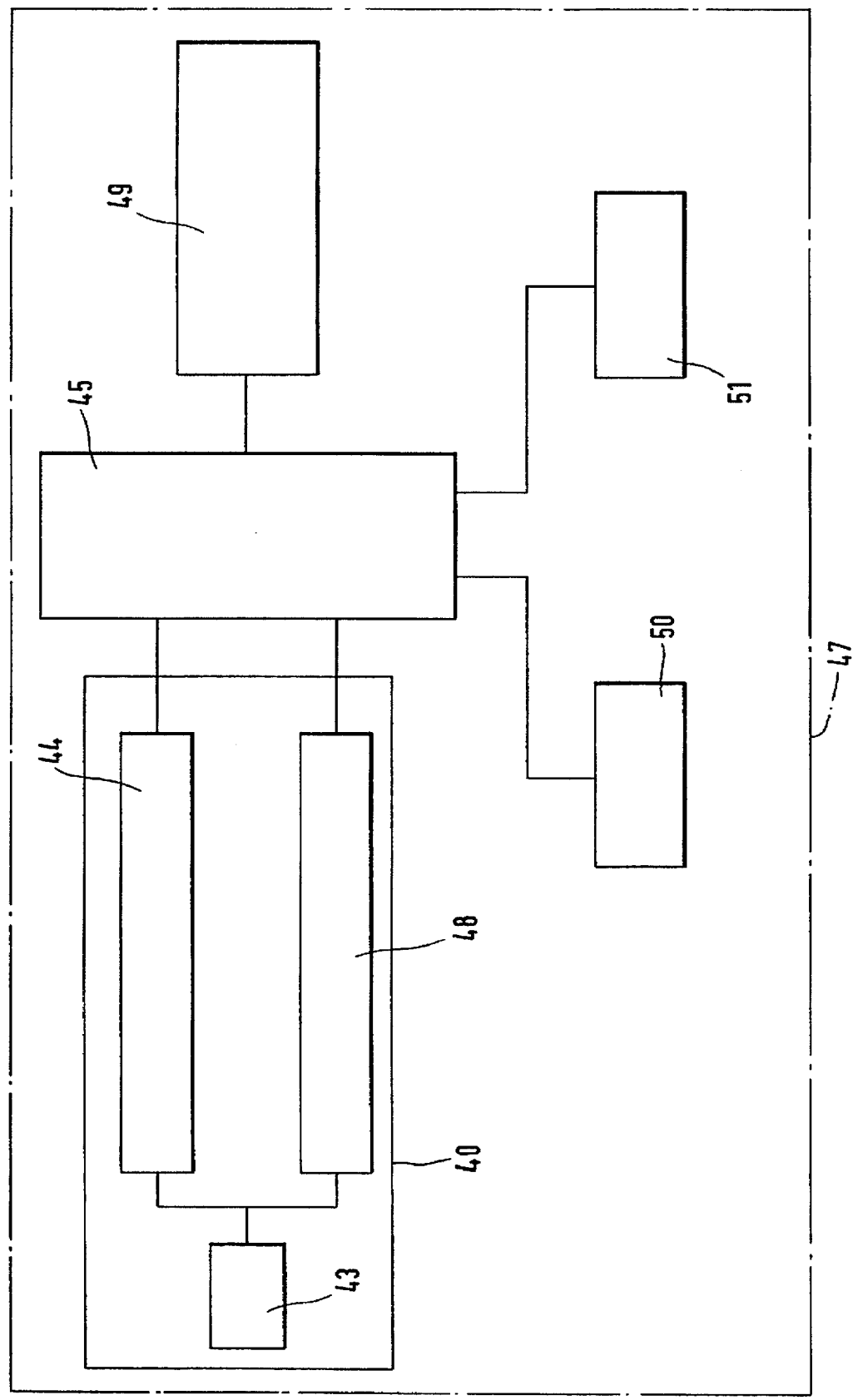
FIG. 5 shows a schematic diagram of the clutch position regulating system.

The voltage changes at the signal outputs of the sensors 43 can preferably be transmitted to a system 44 (see FIG. 5). The system 44 (as shown in FIG. 5) can determine the angle of rotation and can determine, from the number of voltage changes, the angle of rotation which the output shaft 14 has essentially executed, so that the transmission 7 can be moved from a first position into a second position. The system 44 which can determine the angle of rotation can also transmit a signal corresponding to the angle of rotation of the output shaft 14 to a monitoring device 45 of a clutch position regulating system 47. The monitoring device 45 can also receive a signal from a system 48. The system 48 can determine the direction of rotation of the output shaft 14, which system 48 can transmit its signal as a function of the sequence of the signals detected by the sensors 43. The monitoring device 45 can also receive signals from a measurement device 49, by means of which measurement device 49 the amount of energy fed to the drive 4—in this case the current supplied to the electric motor 5—can be measured.

Two memories 50, 51 can preferably be connected to the monitoring device 45. In the first memory 50, data can be stored, which data can correspond to a precisely defined reference position of the transmission 7. The precisely defined reference position can be transmitted as indicated below. The second memory 51 can store default data, which default data can correspond to a default position of the transmission 7. The default data can be called up by the monitoring device 45, until the data corresponding to the defined reference position are essentially input into the memory 50. The data can be input by means of the monitoring device 45.

During the starting of the motor vehicle, or on the occasion of the first clutch engagement or disengagement procedure, energy can be fed to the drive system 4 so that the output shaft 14 can rotate in a predetermined direction. By means of the worm gear 8, the output shaft 14 can thereby drive the segment worm gear 10, until the segment worm gear 10, as a function of its direction of rotation, can essentially come into contact with the stop 81 at the limit 35 or 36, and thus, the segment worm gear 10 can come to a standstill.

As energy essentially continues to be supplied to the drive 4, the output shaft 14 can be blocked on account of the contact between the segment worm gear 10 against the stop 81, so that the incremental position sensor 40 can no longer detect any change in the position of the transmission 7. While the monitoring device 45 can thereby be informed that the output shaft 14 has essentially come to a standstill, the monitoring device 45 can simultaneously receive signals from the energy feed measurement device 49. The signals from the energy feed measurement device 49 can indicate the continued feed of energy to the drive 4. When this combination of signals from the incremental position sensor 40, on one hand, and from the energy feed measurement device 49, on the other hand, is received, the monitoring device 45 can determine that the segment worm gear 10 has essentially assumed an exactly defined reference position as a result of its contact with the stop 81.

As a function of the signals which were transmitted by the system 48, which system 48 could detect the direction of rotation before the output shaft 14 came to a stop, the monitoring device 45 can thereby distinguish with which of the limits 35, 36 the segment worm gear 10 has come into contact on the stop 81. Then the data corresponding to this reference position of the segment worm gear 10 can preferably be stored by the monitoring device 45 in the memory 50, where the data can be called up again as necessary.

With a knowledge of this reference position of the segment worm gear 10, it can be sufficient for the monitoring device 45, by means of the system 44, which system 44 can detect the angle of rotation, and by means of the system 48, which system 48 can detect the direction of rotation, to determine the respective change in position on the segment worm gear 10. As a result, although only one element which can indicate differential positions is provided with the incremental position sensor 40, the absolute position of the segment worm gear 10 can essentially always be determined by referring to the reference position.

In summary, in accordance with an embodiment of the present invention, as shown in FIG. 5, the clutch position regulating system 47 can include the sensors 43, a system 44, and a monitoring device 45. The sensors 43 can transmit signals to the system 44 thereby indicating the direction of rotation of the output shaft 14 to the system 44. Then the system 44 can transmit a signal to the monitoring device 45, which signal can indicate the angle of the rotation of the output shaft 14. In addition, the clutch position regulating system 47 can include the system 48 and the measuring device 49. The sensors 43 can also transmit signals to the system 48 indicating the direction of rotation of the output shaft 14. The measuring device 49 can also transmit a signal to the monitoring device 45, which signal can provide the measure of energy or current supplied to the electric motor 5. In addition, the two memories 50 and 51 can preferably be connected to the monitoring device 45. The memory 50 can store the reference position of the transmission 7 whereas the memory 51 can store the data for the default position of the transmission 7. As a result of the signals transmitted among the elements of the clutch position regulation system 47, the position of the transmission 7 can be determined and therefore regulated.

However, the functions described above essentially only work as long as there are no disruptions or malfunctions in the clutch position regulating system 47. In the event of a disruption or malfunction, however, it is possible for the monitoring device 45 to base its calculations on an incorrect reference position, the result of which can be that the segment worm gear 10 can continue to run with one of its limits 35, 36 toward the stop 81 during the operating phase of the actuator. However, that will essentially be harmless for the operation of the actuator, since on account of the monitoring device, the contact between the segment worm gear 10 and the stop 81 can be recognized, and then the reference position can be newly determined automatically. This determination of the new reference point can occur as explained above, by recording signals from the incremental position sensor 40 and from the measurement device 49.

If, when the vehicle is being started, the reference position of the transmission 7 was not or could not be determined essentially immediately, it can be possible to read data for the reference position from the memory 51, which data correspond to a default position. The data indicating this default position can be recorded in the memory 51, for example, during a previous operating phase of the actuator in the form of the data relating to the then-current reference position. Then, after the vehicle is restarted following a period when it has not been in operation, the data can be read from the memory 51 by the monitoring device 45. The data can then be used as the basis for the displacement of the incremental position sensor 40 until the data for a new reference position is available.

In a simplified embodiment, the clutch position regulator 47 can function even if the measurement device 49 for the energy feed does not measure the amount of energy supplied to the drive system 4. It is, however, essential that, when energy is supplied to the drive system 4, the incremental position sensor 40 must essentially be monitored to detect a rotation of the pulse ring 41 and thus to detect a rotation of the output shaft 14.

Figure 6:
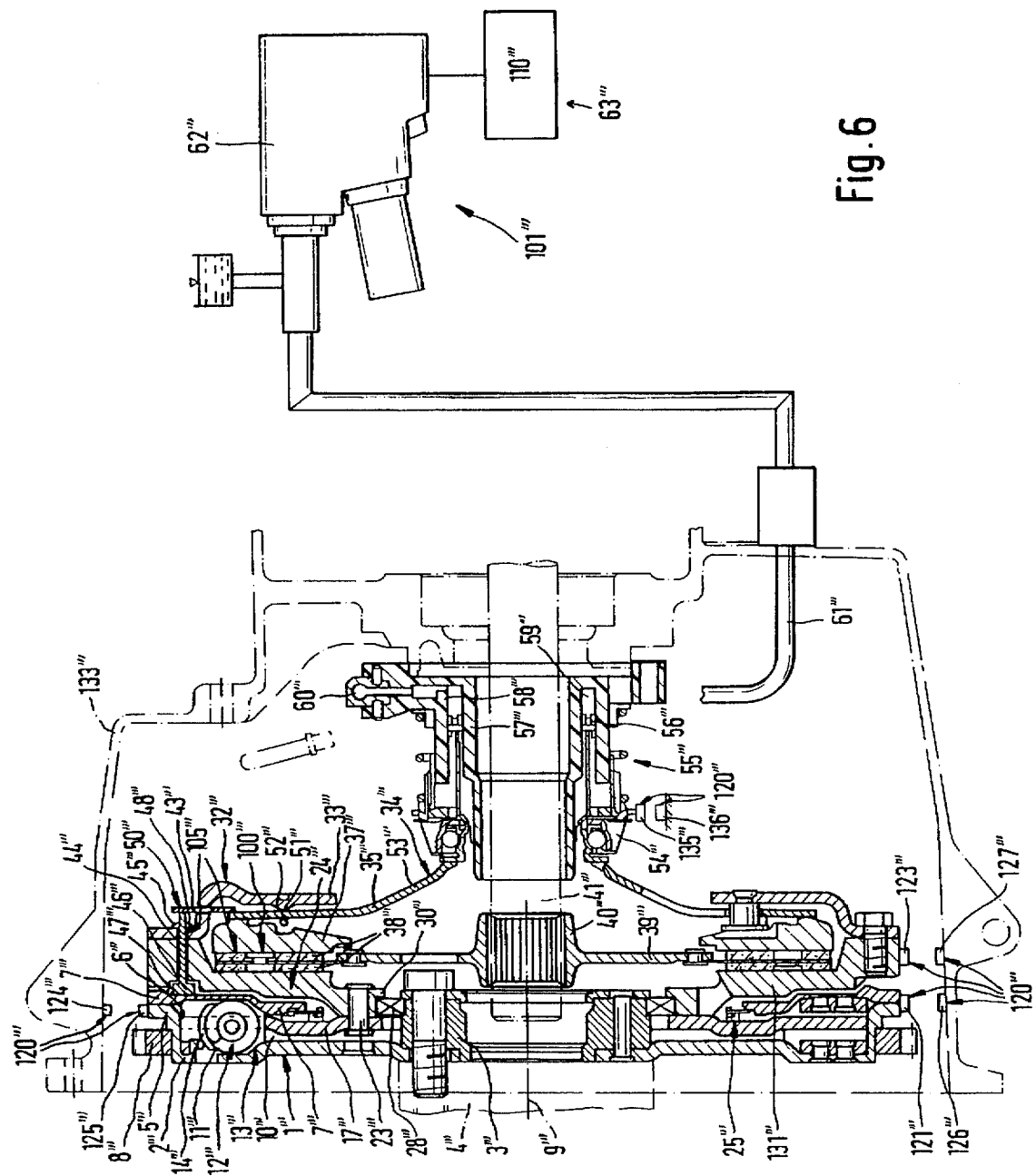
FIG. 6 shows a flywheel apparatus with an actuating drive of an actuator device which acts on a clutch release mechanism and a damping device which has a tappet as the vibration damper.

The flywheel apparatus illustrated in FIG. 6 includes a first centrifugal mass 1''', which can preferably be composed of a primary disc 2'''. The primary disc 2''' can be connected to a hub 3''', whereby the hub 3''' can be detachably fastened to the crankshaft 4''' of a driving mechanism, e.g. an internal combustion engine. The primary disc 2''' can be provided in the vicinity of its outside diameter with a ring 5''' which can have an essentially cylindrical inner wall 6'''. Essentially parallel to the primary disc 2''' and at some axial distance from the disc 2''', there can preferably be a cover plate 7'''. The cover plate 7''' can preferably be connected in the vicinity of its outside diameter to the ring 5'''. On the first centrifugal mass 1''', a starter gear rim 8''' can preferably be designed in one piece with the centrifugal mass 1''', and engages with a starter motor (not shown). Alternatively, as is known in the art, the starter gear rim 8''' could be a separate component that is fixedly attached to the centrifugal mass 1'''. All the parts which are connected to the hub 3''' can preferably rotate together with the crankshaft 4''' of the internal combustion engine around an axis of rotation 9'''.

The inside wall 6''' of the ring 5''' and the radially outer areas of the primary disc 2''' on the cover plate 7''' can form a chamber 10'''. This chamber 10''' can preferably be disposed concentric to the axis of rotation 9'''. In this chamber 10''', there can be spring elements 11''' of a torsion spring system 12''', which together with a known friction device, which is therefore not illustrated, form a torsional vibration damper 13'''. The actuation of the spring elements 11''' results from the first centrifugal mass 1''' by means of segments (not shown) which can be fastened to the inner sides of the primary disc 2''' and the cover plate 7'''. The segments can act on the spring element 11''' to preferably be in contact with the interposition of a flexible helical spring 14'''. In this embodiment, the chamber 10''' can preferably be filled at least partly with a viscous medium. Although the spring elements 11''' on the present flywheel can be relatively rigid, the chamber 10''' need not absolutely be filled with the viscous medium.

The torques absorbed by the torsion spring system 12''' can be transmitted to a hub disc 17''', which hub disc 17''' can preferably be active as a moment carrier 25''' for a second centrifugal mass 24'''. This second centrifugal mass 24''' can preferably be connected to the hub disc 17''' by means of rivets 23'''. The second centrifugal mass 24''', radially inside the connection area, can be placed on a bearing 28''', preferably a roller bearing, which bearing 28''' can preferably be firmly attached to the hub 3''' in the axial direction. The second centrifugal mass 24''' can be axially secured, on one hand, by means of a flange 30''', and, on the other hand, by the radially inner area of the hub disc 17'''. The second centrifugal mass 24''' can also be used to locate a friction clutch 32'''. The friction clutch 32''' can have a clutch housing 33''' fastened to the second centrifugal mass 24'''.

In the clutch housing 33''' a membrane spring 35''' acting as an application means 34''' can be inserted. This membrane spring 35''', by means of its radially outer area, applies pressure with one side to an application plate 37''', which application plate has a common friction surface with a friction lining 38''' of a clutch plate 39'''. The clutch plate 39''' can preferably be equipped with friction linings 38''' on both sides. The Other friction lining 38''' of the clutch plate 39''' can have a common friction surface with a corresponding area of the second centrifugal mass 24'''. The clutch plate 39''' has a hub 40''', by means of which hub 40''' the clutch plate 39''' can preferably be non-rotationally fastened to a transmission-side output shaft 41'''.

The radially outer area of the membrane spring 35''', with its side away from the application plate 37''', can be brought into contact with one end of a lever 43'''. This lever 43''' can preferably be mounted so that it pivots in the middle thereof on the clutch housing 33'''. This lever 43''' can be engaged, on the other end, with the adjacent end of a tappet 44''', which tappet 44''' can penetrate the clutch housing 33''' and the second centrifugal mass 24''' by means of a shaft 45'''. The tappet 44''' can preferably include an extension 46''' running essentially perpendicular to the shaft 45''' in a cavity 47''', which cavity 47''' can be located between the first centrifugal mass 1''' and the second centrifugal mass 24'''. The tappet 44''' can preferably be held in its rest position by a retaining element 48''', whereby the retaining element 48''' can preferably be formed by a spring which can be engaged in notches formed on the shaft 45'''. The tappet 44''', together with the lever 43''', forms a first vibration damper 50''' of a damping device 105'''.

Radially inside the vibration damper 50''', the membrane spring 35''' can preferably be fixed, on one side, by a lug 51''' of the clutch housing 33''', and, on the other side, by a retaining ring 52'''. The membrane spring 35''' can also have tabs 53''', which tabs 53''' extend radially inwardly. The tabs 53''' of the membrane spring 35''' can preferably be engaged on a clutch release bearing 54''' of a clutch release 55'''. The clutch release 55''' can be oriented concentric to the output Shaft 41''', and can have a piston 56''' which can act on the clutch release bearing 54''', and can be guided in a sealed manner between an inner cylindrical wall 57''' and an outer cylindrical wall 58'''. A cylindrical space 59''', defined between the two walls 57''' and 58''', can be connected to a pressure medium connection 60'''. The pressure medium connection 60''' can preferably be connected by means of a line 61''' to an actuating drive 62''', e.g. like the one disclosed in German Patent No. 37 06 849 A1, which corresponds to U.S. Pat. No. 4,852,419.

Such an actuating drive 62''' can preferably be part of an actuation device 101''' which can be connected to a switching apparatus 63''', which switching apparatus 63''' can act as an open-loop or closed-loop control system. The switching apparatus 63''' can be connected to a control unit 110''', as shown in FIG. 6. This control unit 110''' can preferably comprise a microprocessor unit for processing electronic signals. Some examples of control units are provided further herebelow.

For a clearer understanding of this switching apparatus 63''', the sensor apparatus 120''' will be described in detail first. As shown in FIG. 6, this sensor apparatus 120''' can be formed, for example, by a first marking 121''' which can preferably be located so that the marking 121''' rotates in the circumferential direction in the circumferential area on the first centrifugal mass 1'''. Interacting with this marking 121''', there can preferably be a first speed impulse receiver 126''' which monitors the marking 121'''. This speed impulse receiver 126''' can be fastened to a gearbox casing 133''' indicated in dashed lines in FIG. 6. The sensor apparatus 120''' also has a second marking 123''', which second marking 123''' can be provided on the second centrifugal mass 24'''. This second marking 123''' preferably rotates in the circumferential area in the circumferential direction. Interacting with this second marking 123''', there can preferably be a second speed impulse receiver 127''' to monitor the marking 123'''. The receiver 127''' can also be fastened to the gearbox casing 133''', and specifically, like the first receiver 126''', can be located on the inside of the gearbox casing 133''' opposite the corresponding marking 121''' or 123''', respectively. Viewed in the circumferential direction, the markings can have light/dark zones for optical monitoring, or can be configured as Hall effect sensors for electromagnetic monitoring. It would also be conceivable to use the gear teeth of the starter rim 8''' as the first marking 121'''. Some additional examples of optical, magnetic and Hall effect sensors are set forth further herebelow.

When torsional vibrations are initiated in the flywheel apparatus, the two centrifugal masses 1''' and 24''' execute a movement relative to one another, which movement, in essence, could be described as rotation of one disc with respect to the other. This movement can then be detected by means of the rotational speed receivers 126''', 127''' on the basis of the different rotational velocities measured, and can essentially be represented in the form of a relative velocity. On the basis of the known physical relationship of velocity and acceleration, when the relative velocity and a measurement interval are known, if can be possible to determine the relative acceleration of the centrifugal masses 1''' and 24''' in relation to one another, e.g. by means of the microprocessor unit of the switching apparatus 63'''. The determination of the relative acceleration of the two masses with respect to one another can be of major importance, since when the relative acceleration is too high, damage can occur to the flywheel apparatus.

The system can preferably function as follows. If, when the system passes through a resonance frequency, torsional vibrations are transmitted to the first centrifugal mass 1''', which torsional vibrations cause an increase in the relative acceleration of the two centrifugal masses 1''', 24''' with respect to one another. This increase can continue until an excessive relative acceleration of the centrifugal masses 1''', 24''' can be determined by means of the rotational speed sensors 126''', 127'''. A generated signal can then be sent to the sensor apparatus 120'''. As a result of the generated signal, clutch release mechanism 55''' can be displaced far enough by the switching apparatus 63''' and the actuating drive 62''', so that the vibration damper 50''' can be activated and, depending on the settings, the relative acceleration between the two centrifugal masses 1''', 24''' can be either reduced or eliminated altogether.

In the case of a damping action by the vibration damper 50''', as soon as the relative acceleration between the two centrifugal masses 1''', 24''' has been reduced to a specified, allowable value, the vibration damper 50''' can preferably once again be deactivated. The deactivation can be determined as a function of the speed of rotation of the centrifugal masses 1''', 24'''. For determining the speed of rotation, there can be a speed impulse transmitter 125'" on the radially outside portion of the first centrifugal mass 1'", and opposite the transmitter 125'", radially inside on the gearbox casing 133'", illustrated in dashed lines in FIG. 6, there can be a speed impulse receiver 124'". The speed impulse receiver 124'" can preferably be connected to the switching apparatus 63'". At least one speed of rotation, at which a resonance frequency can essentially no longer be expected, can be stored in the above-referenced microprocessor unit as a value for the setting of the switching apparatus 63'".

When the relative acceleration of the centrifugal masses 1'", 24'" can be determined by the sensor apparatus 120'", signals can be sent to the control unit 110'", whereby each signal corresponds to a specified relative acceleration. The control unit 110'" can call up the reference input variable corresponding to the value measured for this relative acceleration from the microprocessor unit, and transmits the reference variable to the actuation device 101'". The actuation device 101'" then operates the actuating drive 62'", and by means of the operating actuating drive 62'", the vibration damper 50'" can be activated with a friction force between the centrifugal masses 1'", 24'" corresponding to the relative acceleration between the centrifugal masses 1'", 24'". It should also be noted that the reference input variables input into the microprocessor unit can be determined as the result of measurement operations and can then be stored. Such measurement operations could essentially be done at the manufacturing facility for a series of operating conditions corresponding to various different types of automobiles, and could then be pre-installed at the factory prior to shipping the assembly to the automobile manufacturer for installation in a drive train.

If the markings 121'", 123'" and the speed impulse receivers 126'", 127'" are omitted, the evaluation of the values transmitted by the speed impulse receivers 124'" can also be sufficient. In this case, both the speed impulse transmitter 125'" and the speed impulse receiver 124'" can be part of the sensor apparatus 120'".

As a function of the instructions received from the switching apparatus 63'", the actuating drive 62'" of the actuation device 101'" can be actuated, preferably at speeds in the range between the starting speed and the idle speed, so that hydraulic fluid in the line 61'" can be displaced into the cylinder chamber 59'" of the hydraulic clutch release mechanism 55'". Thus, the piston 56'" of the clutch release mechanism 55'" can preferably be forced out toward the flywheel apparatus, whereby the clutch release bearing 54'" can push the tabs 53'" of the membrane spring to the left, as shown in FIG. 6. The membrane spring 35'" can thereby be pivoted around its pivot points, these pivot points being formed on the clutch housing 33'" by the lug 51'" and the retaining ring 52'". As a result, on one hand, there can be a reduction of the application force applied to the application plate 37'", and on the other hand, there can be a displacement of the lever 43'" around its axis of rotation on the clutch housing 33'", whereby the lever 43'" displaces the tappet 44'" of the vibration damper 50'" against the action of the retaining element 48'" toward the first centrifugal mass 1'", until the extension 46'" of the tappet 44'" comes into contact against the first centrifugal mass 1'". As a function of the actuator travel of the piston 56'" of the clutch release mechanism 55'", and thus of the displacement of the membrane spring 35'", the tappet 44'" can be pressed more or less strongly against the centrifugal mass 1'", and can generate friction on the latter, which can result in a reduction of the oscillation width of the centrifugal masses 1'" and 24'" with respect to one another, or even to a complete interlocking of the centrifugal masses 1'" and 24'" with one another. Likewise, the oscillation width of the membrane spring 35'" can determine the extent to which the application plate 37'" will be relieved of the application force previously exerted on it. The oscillation width of the membrane spring 35'" can thereby be selected so that there can be some slip between the friction linings 38'" of the clutch plate 39'" and the corresponding friction surface on the second centrifugal mass 24'" and on the application plate 37'", so that the connection between the clutch plate 39'" and the clutch elements 24'", 37'" can be active. Torsional vibrations which cannot be reduced by a conventional friction device can be damped both by the friction which can be generated between the friction linings 38'" of the clutch plate 39'" and the above-mentioned clutch elements 24'", 37'", and also by the friction which is generated by the tappet 44'" on the centrifugal mass 1'", which can be the case in particular when the system passes through a resonance frequency.

As soon as the sensor apparatus 120'", after the decrease of the torsional vibrations to an allowable value, actuates the actuating drive 62'" by means of the switching apparatus 63'" for the opposite direction of action, hydraulic fluid can exit the cylinder chamber 59'" of the clutch release 55'" via the pressure medium connection 60'" and flow into the line 61'". The piston 56'" can thereby be pushed back by the tabs 53'" of the membrane spring 35'", via the clutch release bearing 55'" into its starting position. When the force of the membrane spring 35'" is removed from the lever 43'", the tappet 44'" can be pushed back into its original position under the action of the return element 48'". Simultaneously, as a result of the return movement of the membrane spring 35'", increasing pressure can once again be applied to the application plate 37'", until, as soon as the membrane spring has assumed its starting position, it can again be pressed with the full application force against the friction linings 38'", and, via these friction linings 38'", against the second centrifugal mass 24'".

In place of the membrane spring 35'", which membrane spring 35'" is described above as the application means, it can also be possible to use a membrane disc, which itself would not be able to apply the surface pressure required between the application plate 37'" and the friction linings 38'" of the clutch plate 39'" on the one hand, and between the latter and the second centrifugal mass 24'" acting as the counterpressure plate 131'" on the other hand. When a membrane disc is used as the application means 34'", instead of the clutch release mechanism 55'" mechanism, a clutch engagement mechanism, which has a corresponding design and is therefore not illustrated in detail, can be used, in which essentially only the supply of the pressure medium is reversed, so that, for the engagement of the membrane disc in FIG. 6, the engagement mechanism can be moved to the left, and to release the clutch, the engagement mechanism can be moved to the right. The natural prestress, or bias of the membrane disc is just sufficient to keep the tabs 53'" in contact with the clutch engagement mechanism, when the latter moves toward the right. Such a membrane disc is disclosed, for example, in German Patent Application 44 14 033.

It is understandable that, when a membrane spring 35'" is used as the application means 34'" in combination with a clutch release 55'", the vibration damper 50'" can be activated during the clutch release or disengagement, and when a membrane disc is used as the application means 34'" in connection with an engagement mechanism, the damper 50'" can be activated during clutch engagement. As a function of the design of the lever ratios on the application means 34'", the vibration damper 50''' can also be activated during the engagement or release process, but it can likewise be activated before or after this process. In the latter case, the clutch engagement or release mechanism 55''' must be designed so that, in addition to its own actuator travel, it can travel an additional distance, within which the application means 34''' can activate the vibration damper 50''' before or after an engagement or release of the clutch. Depending on which side of the actuator travel this additional travel is located, the vibration damper 50''' can essentially be activated before or after a clutching procedure, in connection with the design of the clutch engagement or release mechanism 55''' and the design of the application means 34''' as a membrane spring 35''' or as a membrane disc.

If the actuation device 101''' has a clutch pedal instead of an actuating drive 62''', it can then be possible to use the initial pedal travel for the engagement or release process, by moving the clutch release 55''' within its actuator travel and by increasing the pedal travel by an additional distance, to bring the clutch engagement or release mechanism 55''' into the additional travel in which the vibration damper 50''' is activated. Depending on whether this additional pedal travel is toward the driver's foot or in the opposite direction, the vibration damper 50''' can be activated before or after the engagement.

One feature of the invention resides broadly in the actuator, in particular for a motor vehicle friction clutch comprising a drive system, a transmission which converts the motion of the drive system into an essentially translational motion of an output element, whereby the travel of the transmission can be limited by at least one stop, and a clutch position regulating system, characterized by the fact that the clutch position regulating system 47 is provided with a monitoring device 45, by means of which the drive system 4 can be monitored for energy feed and direction of operation, and an incremental position sensor 40 can be monitored for changes in position corresponding to transmission movements in which, when an energy feed to the drive 4 is converted into a corresponding change in position on the incremental position sensor 40, the new position of the transmission 7 can be determined in relation to the old position, while when the incremental position sensor 40 comes to a stop when there is a continued supply of energy to the drive 4, by means of the direction of operation of the drive 4, that is interpreted as an indication that the defined reference position of the transmission 7 corresponding to this direction of operation has been reached, whereby the reference position is assumed when the transmission 7 comes into contact with the stop 81 which corresponds to the direction of operation of the drive 4.

Another feature of the invention resides broadly in the actuator characterized by the fact that the monitoring device 45 has a measurement device 49 which measures the quantity of energy fed to the drive 4, and when the incremental position sensor 40 simultaneously comes to a stop, the measurement values of the measurement device 49 indicate that the transmission 7 has come to a standstill in its reference position corresponding to the respective direction of operation of the drive system 4.

Yet another feature of the invention resides broadly in the actuator characterized by the fact that during a startup of the monitoring device 45, the drive system 4 can be actuated by the monitoring device 45 for an indication of a reference position of the transmission 7 in a predetermined direction of operation for a movement of the transmission 7 until the transmission 7 comes into contact with the stop 81 which corresponds to this direction of operation.

Still another feature of the invention resides broadly in the actuator characterized by the fact that until it reaches the stop 81 corresponding to the respective direction of operation of the drive 4, values which correspond to a default reference position can be called up from a memory 51 corresponding to the monitoring device 45 to determine the instantaneous absolute position of the transmission 7.

A further feature of the invention resides broadly in the actuator with a drive which has an output shaft, characterized by the fact that the incremental position sensor 40 is mounted on the drive 4, and is provided to monitor the rotation of the output shaft 14 of the drive 4.

Another feature of the invention resides broadly in the actuator characterized by the fact that the drive 4 consists of an electric motor 5.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely Federal Republic of Germany Patent Application No. P 44 33 825.2, filed on Sep. 22, 1994, having inventors Udo Borschert, Lutz Leimbach, Manfred Waning, Michael Zottmann, and DE-OS P 44 33 825.2 and DE-PS P 44 33 825.2, as well as their published equivalents, are hereby incorporated by reference as if set forth in their entirety herein.

Some examples of electronic components which may be utilized in accordance with the present invention may be found in the following U.S. Pat. Nos.: No. 5,325,082 entitled "Comprehensive Vehicle Information Storage System"; No. 5,199,325 entitled "Electronic Shift or Clutch Actuator for a Vehicle Transmission" to Dana Corporation; and No. 5,303,807 entitled "Electrohydraulic Device for Controlling the Engagement of the Clutch in Motor Vehicles and the Like" to Fadiel.

Some examples of thermal conductors which may be utilized in accordance with the present invention may be found in the following U.S. Pat. Nos.: No. 5,199,165 entitled "Heat Pipe-electrical Interconnect Integration Method for Chip Modules" to Hewlett-Packard; No. 5,243,218 entitled "Cooling Structure for Electronics Devices" to Fujitsu; No. 5,296,310 entitled "High Conductivity Hybrid Material for Thermal Management" to Materials Science Corporation; and No. 5,345,107 entitled "Cooling Apparatus for Electronic Device" to Hitachi.

Some examples of seals for electronics components which may be utilized in accordance with the present invention may be found in the following U.S. Pat. Nos.: No. 5,278,357 entitled "Electric Wire Holding Case Preventing Oil Leak" to Yazaki; No. 5,326,589 entitled "Method of Protecting Electronic or Electric Part" to Shin-Etsu; No. 5,243,131 entitled "Housing for an Electronic Circuit" to Bosch; and No. 5,282,114 entitled "Ruggedized Computer Assembly Providing Accessibility and Adaptability to, and Effective Cooling of, Electronic Components" to Codar.

Some examples of motor current sensors which may be utilized in accordance with the present invention may be found in the following U.S. Pat. Nos.: No. 5,254,926 entitled "Current-mode Hysteresis Control for Controlling a Motor" to Ford; No. 5,281,900 entitled "DC Motor Controller" to Hyundai; No. 5,304,912 entitled "Control Apparatus for Induction Motor" to Hitachi; No. 5,313,151 entitled "Induction Type Electric Motor Drive Actuator System" to Rotork; and No. 5,350,988 entitled "Digital Motor Controller" to AlliedSignal, Inc.

Some examples of devices for testing electronic components which may be utilized in accordance with the present invention may be found in the following U.S. Pat. Nos.: No. 5,289,117 entitled "Testing of Integrated Circuit Devices on Loaded Printed Circuit" to Everett Charles; No. 5,307,290 entitled "System for the Automatic Testing, Preferably on a Bench, of Electronic Control Systems Which are Intended to be Fitted in Vehicles" to Fiat; and No. 5,315,252 entitled "Automotive Test System with Input Protection" to SPX Corporation.

Some examples of optical and other systems which may be utilized with or in the present invention may be found in the following U.S. Patents:

U.S. Pat. No. 5,280,981, Inventor: Gordon R. Schulz, Title: End effector with load-sensitive digit actuation mechanisms; U.S. Pat. No. 5,250,888, Inventor: Hang du Yu, Title: Apparatus for and process of rotating a display; U.S. Pat. No. 5,191,284, Inventors: Roberto Moretti and Angelo Varvello, Title: Device for detecting the relative rotational speed of two elements in a vehicle wheel; U.S. Pat. No. 5,239,263, Inventors: Hitoshi Iwata, Katsuhiro Minami, Hisahiro Ando, Hisashi Hirose and Shigeru Iguchi, Title: Magnetic rotation sensor for rotary shaft; U.S. Pat. No. 5,252,919, Inventor: Saburo Uemura, Title: Apparatus producing trapezoidal waveforms from a pair of magnetic sensors for detecting the rotating angle of an object; U.S. Pat. No. 5,291,319, Inventor: Ellis D. Harris, Title: Rotating disc optical synchronization system using binary diffractive optical elements; U.S. Pat. No. 5,307,549, Inventors: Seisuke Tsutsumi and Nobuyuki Ito, Title: Apparatus and method for synchronized control of machine tools; U.S. Pat. No. 5,309,094, Inventors: Christian Rigaux and Pascal Lhote, Title: Bearing rotary speed sensor with concentric multipole magnetic rings axially aligned with collector branches; U.S. Pat. No. 5,192,877, Inventors: Jean Bittebierre and Philippe Biton, Title: Hall Effect Sensor and component providing differential detection; Inventors: Shigemi Murata and Masayuki Ikeuchi, Title: Angle detecting device having improved mounting arrangement for mounting Hall-effect sensor.

Some examples of control devices and other systems which might be used with or in the present invention are:

U.S. Pat. No. 4,852,419, Inventors: Friedrich Kittel, Dieter Lutz, Franz Nagler, Horst Oppitz and Gerhard Gasper, Title: Control device, in particular for a motor-vehicle friction clutch; U.S. Pat. No. 5,212,380, Inventors: Seiichi Sato, Kazuo Yamaguchi, Yoshi Kurosawa, Atsushi Ueda and Masami Matsumura, Title: Automotive engine control system with rotary encoder indexing; U.S. Pat. No. 5,326,160, Inventors: John P. Bayliss and Sean Byrnes, Title: Hydraulic systems for vehicles; U.S. Pat. No. 5,307,013, Inventors: Alfred J. Santos and Michael C. Brauer, Title: Digital position sensor system for detecting automatic transmission gear modes.

Some examples of hydraulic master cylinders which may be utilized in accordance with the present invention may be found in the following U.S. Pat. Nos.: No. 5,211,099 entitled "Slave Cylinder for a Hydraulic Actuating System Of a Motor Vehicle Friction Clutch" to Fichtel & Sachs; No. 5,213,187 entitled "Device Relating to a Semi-automatic Clutch for Vehicles"; No. 5,284,017 entitled "Hydraulic Master Cylinder" to Automotive Products; and No. 5,301,597 entitled "Hydraulic Cylinder" to Kugelfischer Schafer.

Some examples of clutch assemblies and various components associated therewith which could possibly utilize the present invention may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the piston-cylinder arrangement of the present invention are disclosed by the following U.S. Patents: U.S. Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. Patents: U.S. Pat. No. 4,634,190 to Wupper, entitled "Hydraulic Brake System With Slip Control"; U.S. Pat. No. 4,643,488 to Reinartz, entitled "Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically operated clutch assembly for a motor vehicle, said clutch assembly comprising:

a flywheel having an axis of rotation and defining an axial direction parallel to the axis of rotation;

a clutch disc;

a pressure plate for applying an axially directed force to said clutch disc, with respect to said axis of rotation of said flywheel, to engage said clutch disc with said flywheel;

said clutch disc being disposed between said flywheel and said pressure plate;

said clutch disc comprising friction lining means for contacting said pressure plate and said flywheel during engagement of said clutch disc with said flywheel;

means for hydraulically activating said clutch disc;

said hydraulic activating means being connected to engage and disengage said clutch disc;

said hydraulic activating means comprising:

chamber means, said chamber means having a first end and a second end, at least a portion of said chamber means containing hydraulic fluid therein;

means for being acted upon by said hydraulic fluid;

said means for being acted upon by said hydraulic fluid being disposed in said chamber means;

means for operatively connecting said pressure plate to said means for being acted upon by said hydraulic fluid;

means for providing hydraulic fluid into and out of said chamber means;

means for actuating said hydraulic activating means;

said actuating means comprising:

a housing;

a mechanical drive mechanism for converting a first geometric movement into a second geometric movement;

said mechanical drive mechanism comprising means for driving at least one component of said mechanical drive mechanism;

said driving means being connected in said mechanical drive mechanism to provide power to said mechanical drive mechanism, and thus to operate said hydraulic activating means;

cylinder means for providing hydraulic fluid under pressure to said means for providing hydraulic fluid into and out of said chamber means;

said mechanical drive mechanism being connected to said cylinder means to provide flow of hydraulic fluid into and out of said chamber means;

means for sensing the position of said at least one component of said mechanical drive mechanism;

said means for sensing the position of said at least one component of said mechanical drive mechanism comprising:

means for providing a reference position relating to said at least one component of said mechanical drive mechanism;

means for providing differences in position of said at least one component of said mechanical drive mechanism;

means for accepting signals indicating differences in position of said at least one component from said means for providing differences in position of said at least one component of said mechanical drive mechanism;

said means for accepting signals, indicating differences in position of said at least one component together with a signal relating to said reference position provided by said means for providing a reference position and for providing a signal relating to a resultant position of said at least one component of said mechanical drive mechanism; and means for providing signals from said means for sensing the position of said at least one component of said mechanical drive mechanism to said driving means to control movement of said driving means;

means for measuring the power provided to said driving means; and said means for providing a reference position of said at least one component of said mechanical drive mechanism comprises stop means for providing at least one of: a first limit position and a second limit position of said at least one component of said mechanical drive mechanism;

means for measuring a magnitude of the energy input to said mechanical drive mechanism to determine contact between said at least one component of said mechanical drive mechanism and said stop means; and said means for measuring a magnitude of the energy input to said mechanical drive mechanism to determine contact between said at least one component of said mechanical drive mechanism and said stop means comprising means for determining a stop position of said at least one component of said mechanical drive mechanism against said stop means for use by said position sensing means to determine at least one reference position of said at least one component of said mechanical drive mechanism during operation.

2. The hydraulically operated clutch assembly according to claim 1, wherein:

said means for providing a reference position of said at least one component of said mechanical drive means comprises means for sensing said at least one of: said first limit position and said second limit position of said at least one component of said mechanical drive mechanism.

3. The hydraulically operated clutch assembly according to claim 2, further comprising:

means for determining said first limit position with respect to said second limit position of said at least one component of said mechanical drive mechanism; and means for determining said second limit position with respect to said first limit position of said at least one component of said mechanical drive mechanism.

4. The hydraulically operated clutch assembly according to claim 3, further comprising:

each of said means for determining said first limit position with respect to said second limit position of said at least one component of said mechanical drive mechanism and said means for determining said second limit position with respect to said first limit position of said at least one component of said mechanical drive mechanism further comprising said means for sensing said at least one of: said first limit position and said second limit position of said at least one component of said mechanical drive mechanism together with said means for measuring said power provided to said driving means.

5. The hydraulically operated clutch assembly according to claim 4, wherein:

said at least one component of said mechanical drive mechanism comprises a first component and a second component;

said first component of said mechanical drive mechanism comprises an output shaft, said output being operatively connected to said driving means;

said second component comprises a transmission of said mechanical drive mechanism;

said means for sensing the position of said at least one component of said mechanical drive mechanism further comprises means for sensing the position of said output shaft of said driving means;

said means for sensing the position of said output shaft comprises means for activating the movement of said driving means to provide movement of said transmission of said mechanical drive mechanism;

said first limit position and said second limit position of said at least one component of said mechanical drive mechanism comprises a first limit position and a second limit position of said transmission of said mechanical drive mechanism;

said movement of said transmission of said mechanical drive mechanism for providing a plurality of positions of said transmission between said first limit position and said second limit position of said transmission of said mechanical drive mechanism;

said reference position of said at least one component of said mechanical drive mechanism comprises at least one of: said first limit position and said second limit position of said transmission of said mechanical drive mechanism;

said stop means for providing said at least one of: said first limit position and said second limit position further comprises a stop, said stop having a first side and a second side;

said stop is disposed substantially adjacent said transmission of said mechanical drive mechanism;

said transmission of said mechanical drive mechanism comprises a first portion for contacting said first side of said stop;

said first limit position of said transmission of said mechanical drive mechanism is defined by said first portion of said transmission of said mechanical drive mechanism being in contact with said first side of said stop;

said transmission of said mechanical drive mechanism comprises a second portion for contacting said second side of said stop;

said second limit position of said transmission of said mechanical drive mechanism is defined by said second portion of said transmission of said mechanical drive mechanism being in contact with said second side of said stop; and said movement of said transmission of said mechanical drive mechanism for providing at least some of said plurality of positions of said transmission of said mechanical drive mechanism before at least one of: said first portion and said second portion of said transmission of said mechanical drive mechanism contacts a corresponding one of: said first side and said second side of said stop.

6. The hydraulically operated clutch assembly according to claim 5, wherein:

said means for providing signals to said driving means to control said driving means further comprises electronic means;

said electronic means comprise at least one memory;

said at least one memory of said electronic means is operatively connected to said means for sensing the position of said output shaft;

said means for sensing the position of said output shaft for providing a signal to said at least one memory;

said reference position of said at least one component of said mechanical drive mechanism comprises a reference position of said transmission of said mechanical drive mechanism;

said signal from said means for sensing the position of said output shaft corresponds to said reference position of said transmission of said mechanical drive mechanism;

said at least one memory for receiving said signal from said means for sensing the position of said output shaft;

said at least one memory for storing said signal corresponding to said reference position of said transmission of said mechanical drive mechanism;

said signal corresponding to said reference position stored in said at least one memory comprises a default reference position of said transmission of said mechanical drive mechanism; and said default reference position stored in said at least one memory comprises means for determining a current position of said transmission of said mechanical drive mechanism.

7. The hydraulically operated clutch assembly according to claim 6, wherein:

said driving means further comprises an electric motor;

said means for sensing the position of said output shaft is disposed on and connected with said driving means;

said output shaft comprises a plurality of gear teeth disposed thereabout;

said transmission comprises a worm gear transmission;

said worm gear transmission comprises a plurality of gear teeth;

said plurality of gear teeth of said worm gear transmission are in mesh with said plurality of gear teeth of said output shaft;

said electric motor for providing a movement of said output shaft;

said plurality of gear teeth of said output shaft for providing movement to said worm gear transmission;

said means for determining the reference position of said worm gear transmission to indicate the required direction of movement of said worm gear transmission to actuate said means for hydraulically activating said clutch disc;

said worm gear transmission is operatively connected with said means for hydraulically activating said clutch disc; and said movement of said worm gear transmission for providing movement to said means for hydraulically activating said clutch disc, to hydraulically activate said clutch disc.

8. The hydraulically operated clutch assembly according to claim 5, wherein:

said means for sensing the position of said output shaft further comprises a rotational transducer;

said output shaft has an axis of rotation and defines an axial direction parallel to the axis of rotation;

said rotational transducer is disposed to concentrically surround said output shaft;

said output shaft for being rotated along a 360° angle of rotation;

said rotational transducer comprises means for sensing said 360° angle of rotation of said output shaft; and said rotational transducer comprises said means for providing signals from said means for sensing the position of said at least one component of said mechanical drive mechanism to said driving means, to control movement of said driving means.

9. An actuator for actuating a hydraulic activating clutch assembly, which clutch assembly comprises: a flywheel having an axis of rotation and defining an axial direction parallel to the axis of rotation; a clutch disc; a pressure plate for applying an axially directed force to said clutch disc, with respect to said axis of rotation of said flywheel, to engage said clutch disc with said flywheel; said clutch disc being disposed between said flywheel and said pressure plate; said clutch disc comprising friction lining means for contacting said pressure plate and said flywheel during engagement of said clutch disc with said flywheel; a system for hydraulically activating said clutch disc; said hydraulic activating means being connected to engage and disengage said clutch disc; said hydraulic activating system comprising: chamber means, said chamber means having a first end and a second end, at least a portion of said chamber means containing hydraulic fluid therein; means for being acted upon by said hydraulic fluid; said means for being acted upon by said hydraulic fluid being disposed in said chamber means; means for operatively connecting said pressure plate to said means for being acted upon by said hydraulic fluid; means for providing hydraulic fluid into and out of said chamber means;

said actuator for actuating said hydraulic activating system comprising:

a housing;

a mechanical drive mechanism for converting a first geometric movement into a second geometric movement;

said mechanical drive mechanism comprising means for driving at least one component of said mechanical drive mechanism;

said driving means being connected in said mechanical drive mechanism to provide power to said mechanical drive mechanism, and thus to operate said hydraulic activating system;

cylinder means for providing hydraulic fluid under pressure to said means for providing hydraulic fluid into and out of said chamber means;

said mechanical drive mechanism being connected to said cylinder means to provide flow of hydraulic fluid into and out of said chamber means;

means for sensing the position of said at least one component of said mechanical drive mechanism;

said means for sensing the position of said at least one component of said mechanical drive mechanism comprising:

means for providing a reference position relating to said at least one component of said mechanical drive mechanism;

means for providing differences in position of said at least one component of said mechanical drive mechanism;

means for accepting signals indicating differences in position of said at least one component from said means for providing differences in position of said at least one component of said mechanical drive mechanism;

said means for accepting signals indicating differences in position of said at least one component together with a signal relating to said reference position provided by said means for providing a reference position, to provide a signal relating to a resultant position of said at least one component of said mechanical drive mechanism; and means for providing signals from said means for sensing the position of at least one component of said mechanical drive mechanism to said driving means, to control movement of said driving means;

means for measuring the power provided to said driving means; and said means for providing a reference position of said at least one component of said mechanical drive mechanism comprising stop means for providing at least one of: a first limit position and a second limit position of said at least one component of said mechanical drive mechanism;

means for measuring a magnitude of the energy input to said mechanical drive mechanism to determine contact between said at least one component of said mechanical drive mechanism and said stop means; and said means for measuring a magnitude of the energy input to said mechanical drive mechanism to determine contact between said at least one component of said mechanical drive mechanism and said stop means comprising means for determining a stop position of said at least one component of said mechanical drive mechanism against said stop means for use by said position sensing means to determine at least one reference position of said at least one component of said mechanical drive mechanism during operation.

10. The hydraulically operated clutch assembly according to claim 9, wherein:

said means for providing a reference position of said at least one component of said mechanical drive means comprises means for sensing said at least one of: said first limit position and said second limit position of said at least one component of said mechanical drive mechanism;

means for determining said first limit position with respect to said second limit position of said at least one component of said mechanical drive mechanism; and means for determining said second limit position with respect to said first limit position of said at least one component of said mechanical drive mechanism.

11. The hydraulically operated clutch assembly according to claim 10, further comprising:

each of said means for determining said first limit position with respect to said second limit position of said at least one component of said mechanical drive mechanism and said means for determining said second limit position with respect to said first limit position of said at least one component of said mechanical drive mechanism further comprising said means for sensing said at least one of: said first limit position and said second limit position of said at least one component of said mechanical drive mechanism together with said means for measuring said power provided to said driving means;

said at least one component of said mechanical drive mechanism comprises a first component and a second component;

said first component of said mechanical drive mechanism comprises an output shaft, said output being operatively connected to said driving means;

said second component comprises a transmission of said mechanical drive mechanism;

said means for sensing the position of said at least one component of said mechanical drive mechanism further comprises means for sensing the position of said output shaft of said driving means;

said means for sensing the position of said output shaft comprises means for activating the movement of said driving means to provide movement of said transmission of said mechanical drive mechanism;

said first limit position and said second limit position of said at least one component of said mechanical drive mechanism comprises a first limit position and a second limit position of said transmission of said mechanical drive mechanism;

said movement of said transmission of said mechanical drive mechanism for providing a plurality of positions of said transmission between said first limit position and said second limit position of said transmission of said mechanical drive mechanism;

said reference position of said at least one component of said mechanical drive mechanism comprises at least one of: said first limit position and said second limit position of said transmission of said mechanical drive mechanism;

said stop means for providing said at least one of: said first limit position and said second limit position further comprises a stop, said stop having a first side and a second side;

said stop is disposed substantially adjacent said transmission of said mechanical drive mechanism;

said transmission of said mechanical drive mechanism comprises a first portion for contacting said first side of said stop;

said first limit position of said transmission of said mechanical drive mechanism is defined by said first portion of said transmission of said mechanical drive mechanism being in contact with said first side of said stop;

said transmission of said mechanical drive mechanism comprises a second portion for contacting said second side of said stop;

said second limit position of said transmission of said mechanical drive mechanism is defined by said second portion of said transmission of said mechanical drive mechanism being in contact with said second side of said stop; and said movement of said transmission of said mechanical drive mechanism for providing at least some of said plurality of positions of said transmission of said mechanical drive mechanism before at least one of: said first portion and said second portion of said transmission of said mechanical drive mechanism contacts a corresponding one of: said first side and said second side of said stop.

12. The hydraulically operated clutch assembly according to claim 11, wherein:

said means for providing signals to said driving means to control said driving means further comprises electronic means;

said electronic means comprise at least one memory;

said at least one memory of said electronic means is operatively connected to said means for sensing the position of said output shaft;

said means for sensing the position of said output shaft for providing a signal to said at least one memory;

said transmission comprises a worm gear transmission;

said reference position of said at least one component of said mechanical drive mechanism comprises a reference position of said worm gear transmission of said mechanical drive mechanism;

said signal from said means for sensing the position of said output shaft corresponds to said reference position of said worm gear transmission of said mechanical drive mechanism;

said at least one memory for receiving said signal from said means for sensing the position of said output shaft;

said at least one memory for storing said signal corresponding to said reference position of said worm gear transmission of said mechanical drive mechanism;

said signal corresponding to said reference position stored in said at least one memory comprises a default reference position of said worm gear transmission of said mechanical drive mechanism;

said default reference position stored in said at least one memory comprises means for determining a current position of said worm gear transmission of said mechanical drive mechanism;

said driving means further comprises an electric motor;

said means for sensing the position of said output shaft is disposed on and connected with said driving means;

said output shaft comprises a plurality of gear teeth disposed thereabout;

said worm gear transmission comprises a plurality of gear teeth;

said plurality of gear teeth of said worm gear transmission are in mesh with said plurality of gear teeth of said output shaft;

said electric motor for providing a movement of said output shaft;

said plurality of gear teeth of said output shaft for providing movement to said worm gear transmission;

said means for determining the reference position of said worm gear transmission to indicate the required direction of movement of said worm gear transmission to actuate said system for hydraulically activating said clutch disc;

said worm gear transmission is operatively connected with said system for hydraulically activating said clutch disc;

said movement of said worm gear transmission for providing movement to said system for hydraulically activating said clutch disc, to hydraulically activate said clutch disc;

said means for sensing the position of said output shaft further comprises a rotational transducer;

said output shaft has an axis of rotation and defines an axial direction parallel to the axis of rotation;

said rotational transducer is disposed to concentrically surround said output shaft;

said output shaft for being rotated along a 360° angle of rotation;

said rotational transducer comprises means for sensing said 360° angle of rotation of said output shaft; and said rotational transducer comprises said means for providing signals from said means for sensing the position of said at least one component of said mechanical drive mechanism to said driving means, to control movement of said driving means.

13. An actuator for a motor vehicle friction clutch comprising:

a drive;

a transmission;

said transmission comprising an output element structure;

said output element structure comprising an output element;

said transmission comprising means for converting motion of said drive to motion of said output element;

at least one stop;

said at least one stop being disposed to limit changes of position of said output element;

means for measuring a magnitude of the energy input to said drive to determine contact between said output element structure and said at least one stop;

a position sensor;

said position sensor being operatively disposed to monitor changes of position of said output element;

said means for measuring a magnitude of the energy input, to said drive to determine contact between said output element and said at least one stop, comprising means for determining a stop position of said output element against said at least one stop for use by said position sensor to determine at least one reference position of said output element during operation; and said means for determining a stop position against said at least one stop for use by said position sensor to determine at least one reference position of said output element during operation comprising means for recording an updated stop position.

14. An actuator for a motor vehicle friction clutch as claimed in claim 13, wherein said means for measuring a magnitude of the energy input to said drive and to determine contact between said output element structure and said at least one stop comprises means for determining the direction of motion of said output element.

15. An actuator for a motor vehicle friction clutch as claimed in claim 14 wherein in said position sensor comprises an incremental position sensor.

16. An actuator for a motor vehicle friction clutch as claimed in claim 15 wherein said output element comprises a linear output element for linear motion.

17. An actuator for a motor vehicle friction clutch as claimed in claim 16 wherein:

said drive comprises an output shaft;

said incremental position sensor comprises means for sensing rotation of said output shaft.

18. An actuator for a motor vehicle friction clutch as claimed in claim 17 comprising:

means for calibrating, said means for determining a stop position against said at least one stop for use by said position sensor, to determine at least one reference position of said output element during operation;

said calibrating means comprising means for extending said output element structure of said transmission to contact at least one of said at least one stop.

19. An actuator for a motor vehicle friction clutch as claimed in claim 18 wherein said drive comprises an electric motor.

* * * * *

UNITED STATES PATENT AND TRADEMARK OFFICE
CERTIFICATE OF CORRECTION

PATENT NO. : 5,678,673            Page 1 of 2

DATED : October 21, 1997

INVENTOR(S) : Udo BORSCHERT, Lutz LEIMBACH, Manfred WANING, and Michael ZOTTMANN It is certified that error appears in the above-identified patent and that said Letters Patent is hereby corrected as shown below:

On the title page, item [56], under the U.S. PATENT DOCUMENTS section, before '3/1990', delete "4,911,278" and insert --4,911,276--.

On the title page, item [56], under the U.S. PATENT DOCUMENTS section, after the entry for 4,911,276 insert the following:

| | | | | |
|---|---|---|---|---|
| 4,538,717 | 09/1985 | Blohm et al. | 192 | 142R(XR) |
| 4,645,992 | 02/1987 | Ritenour | 318 | 469 |
| 5,453,669 | 09/1995 | Nishibe et al. | 318 | 476(XR) |
| 5,543,692 | 08/1996 | Howie et al. | 318 | 469(XR) |

In column 12, line 37, after 'known,', delete "if" and insert --it--.

UNITED STATES PATENT AND TRADEMARK OFFICE
CERTIFICATE OF CORRECTION

PATENT NO. : 5,678,673
DATED : October 21, 1997
INVENTOR(S) : Udo BORSCHERT, Lutz LEIMBACH, Manfred WANING, and Michael ZOTTMANN It is certified that error appears in the above-identified patent and that said Letters Patent is hereby corrected as shown below:

In column 15, line 53, after '45', delete "bas" and insert --has--.

In column 28, line 8, Claim 15, after 'wherein' delete "in".

Signed and Sealed this

Tenth Day of March, 1998

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,678,673
DATED : October 21, 1997
INVENTOR(S) : Udo BORSCHERT, Lutz LEIMBACH, Manfred WANING, and Michael ZOTTMANN It is certified that error appears in the above-identified patent and that said Letters Patent is hereby corrected as shown below:

On the title page, item [30], under the FOREIGN APPLICATION PRIORITY DATA section, after 'Sep. 22, 1994', delete "[GB] United Kingdom" and insert --[DE] Federal Republic of Germany--.

Signed and Sealed this

Fourteenth Day of April, 1998

Attest:

BRUCE LEHMAN

Attesting Officer *Commissioner of Patents and Trademarks*